United States Patent [19]

Mayer et al.

[11] 3,898,961

[45] Aug. 12, 1975

[54] STEAM GENERATOR

[75] Inventors: Hans Mayer, Bubenreuth; Heinz-Jürgen Schröder, Erlangen, both of Germany

[73] Assignee: Siemens Aktiengesellschaft, Munich, Germany

[22] Filed: June 12, 1973

[21] Appl. No.: 369,229

[30] Foreign Application Priority Data

June 26, 1972 Germany.......................... 2231182

[52] U.S. Cl.................................. 122/32; 122/407
[51] Int. Cl............................................. F22b 1/06
[58] Field of Search .................. 122/32, 33, 34, 407

[56] References Cited
UNITED STATES PATENTS

| | | | |
|---|---|---|---|
| 3,378,456 | 4/1968 | Roberts.......................... | 122/407 X |
| 3,706,301 | 12/1972 | Penfield, Jr........................... | 122/32 |

FOREIGN PATENTS OR APPLICATIONS

| | | | |
|---|---|---|---|
| 1,086,243 | 10/1967 | United Kingdom................... | 122/34 |

*Primary Examiner*—Kenneth W. Sprague
*Attorney, Agent, or Firm*—Kenyon & Kenyon Reilly Carr & Chapin

[57] ABSTRACT

A pressurized-water coolant nuclear reactor steam generator has a vertical housing for the steam generating water and containing an upstanding heat exchanger to which the pressurized-water coolant passes and which is radially surrounded by a guide jacket supporting a water separator on its top. By thermosiphon action the steam generating water flows upward through and around the heat exchanger within the guide chamber to the latter's top from which it flows radially outwardly and downwardly through a down draft space formed between the outside of the jacket and the housing. The water separator discharges separated water downwardly. The housing has a feed water inlet opening adjacent to the lower portion of the heat exchanger, providing preheating of the introduced feed water. This is done by the use of walls forming an enclosure around a lower portion of the heat exchanger and through which the feed water is passed from the water inlet for ultimate introduction to the steam generating water. These walls, defining the preheater, are in the flow path of the circulation established by the thermo-siphon action and forms a partial obstruction to this flow. Also, within the preheater there are flow deflecting baffles for causing the feed water to undulate back and forth with respect to the heat exchanger's portion involved, thus reducing the velocity of the introduced feed water which might otherwise be used to reduce the effect of the obstruction caused by the preheater. To diminish or eliminate these effects, the output of the feed water preheater is conducted to one or more jet pumps positioned in the down-draft space and pointing downwardly therein and thus applying force to the flow offsetting the effects caused by the preheater.

4 Claims, 1 Drawing Figure

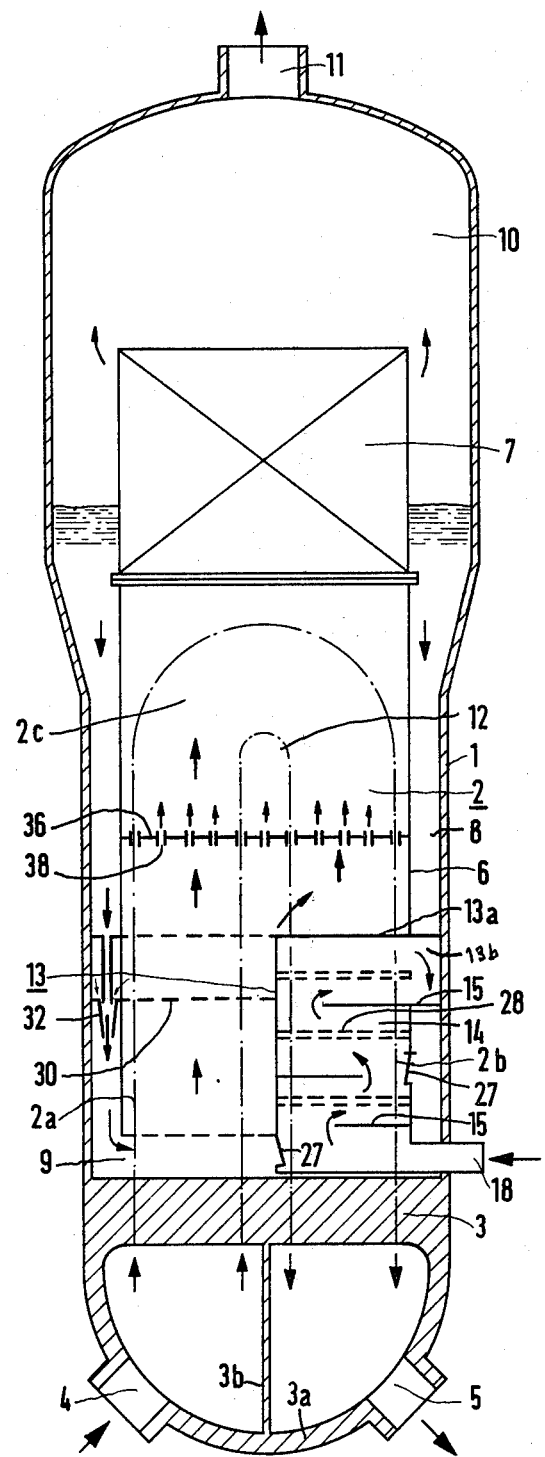

STEAM GENERATOR

BACKGROUND OF THE INVENTION

A pressurized-water coolant nuclear reactor steam generator includes a vertical housing for the steam generating water and containing an inverted U-shaped nest of heat-exchanging tubes having inlet and outlet ends and radially enclosed by a vertical guide jacket which guides the steam generating water upwardly. The jacket's top supports a water separator. The housing forms a down-draft space around the jacket and has a feed water inlet adjacent to the outlet end of the nest, the separator discharging water separated from the steam, downwardly into a space. The inlet and outlet ends of the nest are in circuit with the coolant conduit of the nuclear reactor.

Preheating of the feed water effected by its introduction adjacent to the heat exchanger's outlet end, increases the thermal efficiency of the steam generator.

This preheating is effected by a preheater formed by walls surrounding the outlet end of the nest of heat exchanging tubes. The feed water inlet connects with the lower end of this preheater and within the latter baffles cause the feed water to meander back and forth transversely while going upwardly, the preheated feed water leaving at the top of the preheater and being introduced to the steam generating water.

The circulation of the steam generating water is normally due to the thermo-siphon effect obtained by the vertical guide jacket. The boiling water producing the steam travels upwardly around the heat exchanger tubes and produces steam, the water outside of the jacket being less hot and falling downwardly to maintain the supply within the guide jacket. This normal circulation is impeded by the preheater which is necessary within the circulation flow path. Also, the baffles within the preheater reduce the velocity of the preheated feed water introduced to the steam generating water.

SUMMARY OF THE INVENTION

One object of the present invention is to retain the heating efficiency advantage provided by the preheating while overcoming the disadvantage of the preheater obstruction to the circulating of the steam generating water. This object is attained by the present invention by providing means connected with the output of the preheater for forming at least one jet of the preheated feed water directed in the direction of the usual flow to add circulating force to it. This means is provided by one or more jet pumps positioned in the down-draft space and operating downwardly. There may be a circumferential series of these jet pumps all connected to the output of the preheater. The jet pumps act to increase the velocity of the preheated feed water. The walls of the preheater may be provided with pressure-responsive valves or vanes which open in the event the pressure differential between the inside of the preheater and the steam generating water becomes so great as to risk rupturing the walls of the preheater. Above the preheater and within the guide jacket a transverse plate or baffle may extend having a plurality of openings which redistribute the ascending flow of steam generating water which may possibly be rendered somewhat turbulent by flowing around the preheater. This baffle may be positioned just below the upward zone in the guide jacket where the boiling water is converted to steam.

It is to be understood that the coolant supplied by the reactor is under the pressure of a pump. In any event the feed water introduced to the generator must have a higher pressure than the steam generating water in the generator's housing. It is a part of this pressure that is used for the forced circulation of the water in the generator's housing. This forced circulation is confined to the steam generating water; within the preheater a forced flow is obtained by the feed water's pressure.

With this invention it is the feed water itself which provides the circulating force. The jet pumps involved are simple devices without moving parts and are not supplied with liquid from an external source. In particular, the jet pumps of this invention are not supplied with external steam which can mix with the steam generating water to produce complications. Steam in the steam generating water must be removed in one fashion or another.

Regardless of the thermo-siphon effect, the jet pumps provide stable circulation by producing a forced downward flow in the down-draft space and up through the boiling space inside of the guide jacket. This forced circulation permits the dimensions of the entire steam vessel to be reduced as compared to the dimensions of an otherwise corresponding steam generator having the feed water preheater, but relying solely on thermo-siphon circulation. The generator can be operated with less water and more steam in the nest of tubes, thus reducing the pressure loss and providing a higher output pressure by the generator. In turn, the quantity of water which must be separated out in the water separator is reduced, thus permitting the use of a smaller and possibly less complicated water separator. Also, there is less pressure loss in the water separator, which has a flow-stabilizing effect.

BRIEF DESCRIPTION OF THE DRAWING

The accompanying drawing schematically illustrates one embodiment of the present invention, the single FIGURE being a vertical section of the steam generator.

DESCRIPTION OF THE PREFERRED EMBODIMENT

Having reference first to FIG. 1 of the above drawings, the steam generator has a generally cylindrical elongated vertical housing 1 containing the U-shaped nest 2 of heat exchanging tubes which, to avoid confusion, is shown only in outline by dash-dot-dash lines. The inlet end of the nest is via the bottom of the left-hand leg 2a and the outlet end of the nest is via the bottom of the right-hand leg 2b, these legs extending vertically for a substantial distance upwardly within the housing 1, joining by a curved portion 2c, and having their inlet and outlet ends mounted in a horizontal tube plate 3, which together with the hemispherical bottom 3a of the housing, forms two chambers separated from each other by a vertical wall 3b. The pressurized water coolant from the reactor (not shown) is introduced through the inlet 4 where it flows from the left-hand chamber into the inlet end of the left-hand nest leg 2a, the coolant going upwardly around the curve and downwardly and from the outlet end flowing into the right-hand one of the two chambers mentioned and out from the outlet 5 for return to the reactor.

Conventionally, a pressurized water reactor coolant is light water under a pressure of, for example, 150 kg/cm² with temperatures of about 300°C. The walls 3 and 3a, and the heat exchanging tube nest 2 must be capable of resisting such pressures and temperatures. The pressure differential on opposite sides of the wall 3b is not excessive.

The tube nest 2 is radially enclosed by a cylindrical tubular guide jacket 6 which extends from the bottom portion of the nest to above its top, and the top of this jacket supports a water separator 7. Between the outside of this jacket and the inside of the housing a so-called down-draft space 8 is defined, the bottom of this space communicating with the inside of the jacket and the water flowing upwardly within the latter for evaporation and the production of steam which passes upwardly through the water separator 7 with the steam freed from water collecting in the steam dome 10 from which it is sent to do useful work via an outlet 11. The boiling area 12 is in the upper portion of the jacket 6.

The preheater is generally indicated schematically at 13. Walls 13a form a chamber extending inwardly from the jacket 6 and surrounding a substantial portion of the leg of the heat exchanging tube nest leg 2b which receives the coolant via the curve 2c in the inverted U-shaped nest. The bottom of the chamber defining the heat exchanger 13 is close to the top of the housing's wall 3 and the chamber extends upwardly for a substantial portion of the length of the leg 2b. The steam generator's feed water inlet 18 enters the bottom of this chamber and is undulatingly deflected back and forth through the medium of baffles 15 inside of the chamber so as to pass back and forth between the heat exchanging tubes.

The output of the preheater 13 is via the preheater's outlet 13b and a duct 30 which carries the output to at least one jet pump 32. This jet pump is positioned in the down-draft space 8 and it pumps the steam generating water flow in the down-draft space, in a downwardly direction. Although not shown, there would preferably be two or more of these jet pumps 32 positioned symetrically around the guide jacket 6 in the down-draft space 8 and all pointing downwardly. These jet pumps introduce the feed water required to maintain the level of the steam generating water in the housing 1. Their effect is to provide a stable flow of recirculating steam generating water which in the jacket 6 converts to steam. For example, at small circulation numbers of 1.5, a stable flow is maintained, the preheated feed water mixing with the steam generating water and entering the guide jacket 6 via its bottom at 9.

The velocity of the feed water in the preheater 13 can be relatively low because the pressure required for the operation of the jet pump 32 can be made independent within wide limits of the flow in the preheater, by the design of the jet pump. The jet pump design inherently increases the flow velocity to produce the jet pump action. Nevertheless, it may be advisable to arrange special braces 28 in the preheater which secure together the nest of tubes of the leg 2b to prevent them from vibrating. For this purpose straps can be used which cover the entire cross section of the tube nest's leg 2b.

Within the guide jacket the flow may be somewhat disturbed or turbulent due to the presence of the preheater 13 which projects inside of the jacket and around the heat exchanging tube nest's leg 2b. Therefore, a guide arrangement 36 is provided to render the flow more uniform as it enters the boiling zone which is above this arrangement. The arrangement consists essentially of a plate extending transversely to the legs of the heat exchanger and having its edge connected with the inside of the guide jacket, this plate having a plurality of widely distributed passages or openings 38. The purpose is to direct the rising steam generating water in such a way as to provide a uniform upward flow in the boiling area 12.

What is claimed is:

1. A pressurized-water coolant nuclear reactor steam generator including a vertical housing containing an inverted U-shaped nest of heat-exchanging tubes having coolant inlet and outlet ends and radially enclosed by a vertical guide jacket and having a feed water inlet adjacent to said nest's outlet end, steam-generating water in said housing flowing downwardly in said down-draft space and upward through said guide jacket and radially outwardly and inwardly around the top and bottom of the guide jacket respectively, thus establishing a recirculating flow path, and a feed water preheater having walls forming a chamber surrounding a substantial portion of said tube nest's outlet end and connected with said feed water inlet, said preheater chamber having an outlet for the preheater's output; wherein the improvement comprises means connected with said outlet of said preheater chamber for forming at least one jet of the preheated feed water output of said preheater, directed in the direction of said flow to add circulating force thereto.

2. The steam generator of claim 1 in which said means is formed by at least one jet pump positioned in said down-draft space and operating downwardly and a duct connecting said preheater chamber's outlet with said jet pump.

3. The steam generator of claim 2 in which said preheater chamber is provided with pressure relief means.

4. The steam generator of claim 1 in which a perforated plate extends transversely across said guide jacket above said preheater.

* * * * *